United States Patent [19]

Schnoor et al.

[11] Patent Number: 5,358,139
[45] Date of Patent: Oct. 25, 1994

[54] CONTAINER FOR AN OXYGEN SUPPLY UNIT FOR INSTALLATION IN AN AIRCRAFT

[75] Inventors: Christian Schnoor, Lübeck; Roderich Thometschek, Stockelsdorf; Wolfgang Rittner, Bad Schwartau, all of Fed. Rep. of Germany

[73] Assignee: Drägerwerk AG, Lubeck, Fed. Rep. of Germany

[21] Appl. No.: 987,111

[22] Filed: Dec. 4, 1992

[30] Foreign Application Priority Data

Dec. 6, 1991 [DE]  Fed. Rep. of Germany ....... 4140265

[51] Int. Cl.⁵ ............................................. B65D 8/00
[52] U.S. Cl. .................................... 220/669; 220/675
[58] Field of Search ............... 220/669, 670, 675, 337, 220/338, 340

[56]  References Cited

U.S. PATENT DOCUMENTS

| | | | |
|---|---|---|---|
| D. 223,144 | 3/1972 | Bloch | 220/675 X |
| 3,583,623 | 6/1971 | Golner et al. | 220/675 X |
| 4,616,762 | 10/1986 | Alexander | 220/669 X |
| 4,834,243 | 5/1989 | Langenbeck | 220/675 X |
| 4,840,171 | 6/1989 | Röhling | |

*Primary Examiner*—Steven M. Pollard
*Attorney, Agent, or Firm*—McGlew and Tuttle

[57] ABSTRACT

A container for an oxygen supply unit is to be improved such that it can be manufactured in one piece and has high mechanical stability at the lowest possible weight. To accomplish this task, the container (1) has reinforcing structures, which extend at least as bead-shaped first depressions (2) from the container bottom (5) and/or over the rear container wall (42) into the rear container edge (62), and/or as second depressions (21) from the container bottom (5) and/or over the front container wall (41) into the front container edge (61), and/or as third depressions (22) in the transition area between the rear container wall (42) and the container side walls (43).

13 Claims, 1 Drawing Sheet

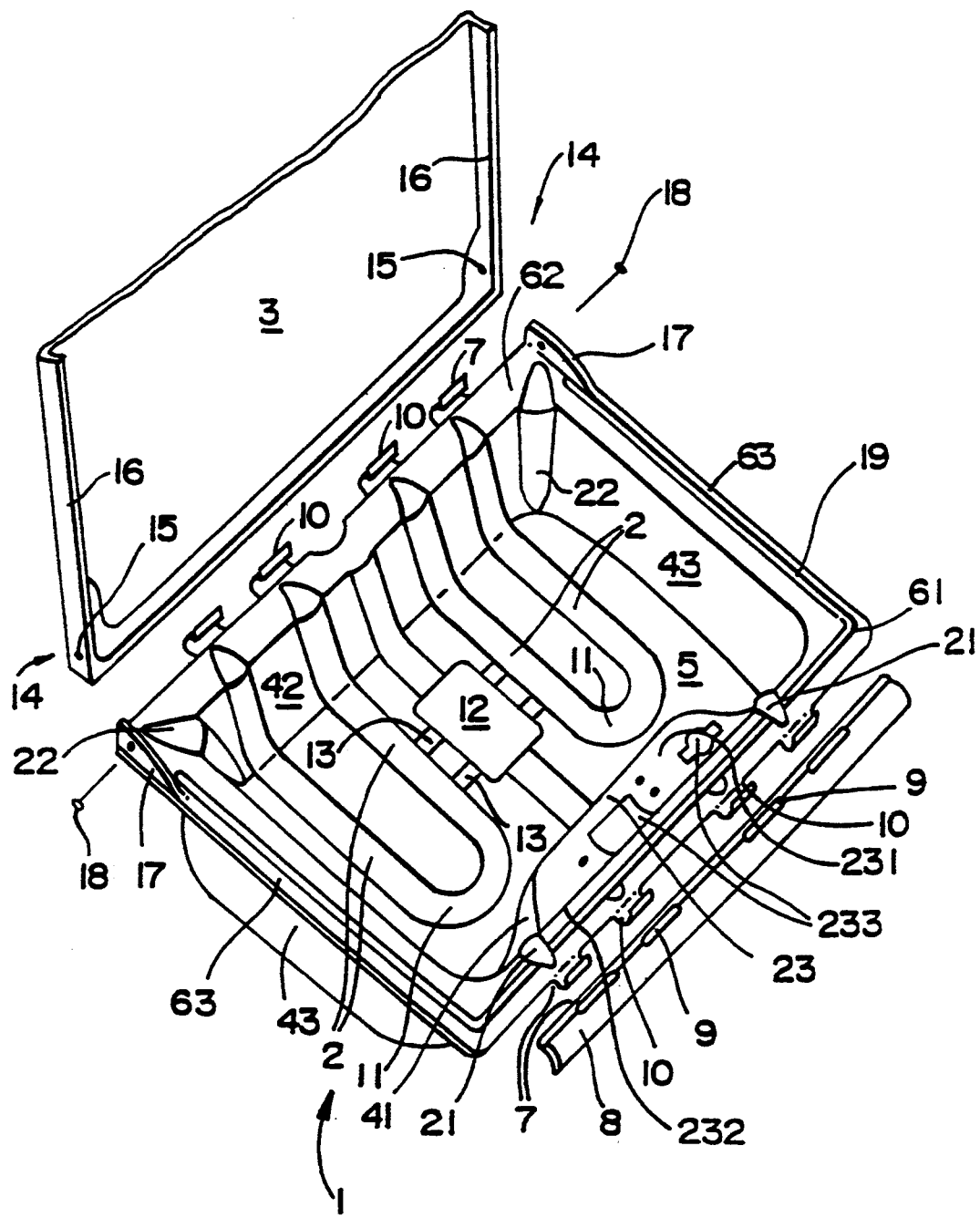

CONTAINER FOR AN OXYGEN SUPPLY UNIT FOR INSTALLATION IN AN AIRCRAFT

FIELD OF THE INVENTION

The present invention pertains to a container for an oxygen supply unit for installation in an aircraft with a container edge that is folded over at least partially, with a container door pivotable around a joint at the rear edge of the container, and with profiled rails that can be folded around hinges at the front and rear edges of the container, in parallel to the axis of rotation of the joint.

BACKGROUND OF THE INVENTION

An oxygen supply unit for installation in an aircraft has become known from U.S. Pat. No. 4,840,171 (corresponding to DE-A137,19,427). Such oxygen supply units are arranged in the ceiling structures in the passenger space aircraft and are used to supply the passengers with the oxygen necessary for breathing in the case of need. The oxygen supply unit consists of a container, in which oxygen masks and an oxygen generator are arranged, and of a container door pivotable around a joint, which door is used to close the container. The container has a circumferential container edge folded over to the outside, to which the joint of the container door is attached. In parallel to the axis of rotation of the joint, profiled rails that can be folded around a hinge are arranged at the edge of the container, and the complete oxygen supply unit can be suspended by means of these profiled rails in the ceiling structure of the aircraft. The container is made of a light material, e.g., plastic, as a one-piece container, with a reinforcing frame, which is placed on the plastic container in the area of the edge of the container.

It is disadvantageous in the prior-art container that a reinforcing frame, which imparts the necessary stability to the container of the oxygen supply unit, is necessary in addition to the plastic container. Such containers are manufactured in large lots and are also present in a corresponding number in the aircraft. It is therefore desirable to manufacture these with the smallest possible weight, with a minimum number of parts, as well as with high mechanical stability.

SUMMARY AND OBJECTS OF THE INVENTION

The basic object of the present invention is to improve a container such that it will have a high rigidity to warping, high flexural strength in the area of connection elements, such as joints and hinges, can be manufactured in one piece, and has the lowest possible weight.

This object is attained by the container having reinforcing means, which extend as bead-shaped
- first depressions from the bottom of the container and/or over the rear wall of the container into the rear edge of the container, and/or as
- second depressions from the bottom of the container and/or over the front wall of the container into the front edge of the container, and/or as
- third depressions in the transition area between the rear wall of the container and the side walls of the container.

The advantage of the present invention is essentially the fact that the resistance to warping of the container is markedly improved, and reinforcing in the area of the connection elements, such as joints and hinges, is achieved due to the special guiding of the bead-shaped depressions. As was shown by experiments, the bead-shaped depressions pointing toward the interior of the container act as reinforcing elements, which improve the introduction of forces from the edge of the container into the wall or the bottom of the container, and impart the necessary flexural strength and torsion-proofness on the wall and the bottom of the container. Even though bead-shaped depressions as reinforcing elements have been known in containers, the special guiding and the location of the depressions for achieving the desired rigidity of the entire container is important in this case. A separate reinforcing frame is no longer necessary because of the improved rigidity of the container according to the present invention.

First depressions, which extend from the bottom of the container over the rear wall of the container into the rear edge of the container, or only from the rear wall of the container into the rear edge of the container, are provided. The second depressions extend from the front wall of the container into the front edge of the container, or also from the bottom of the container over the front wall of the container into the front edge of the container. The third depressions are located in the transition area between the rear wall of the container and the adjacent side walls of the container.

To increase the rigidity in the area of the bottom of the container, it is advantageous to bring together free ends of two adjacent first or second depressions as a semicircle.

Additional reinforcement of the bottom of the container is achieved if this is provided, in combination with the bead-shaped first or second depressions, with a rectangular, flat recess pointing toward the interior of the container. The flat recess is provided in the middle of the bottom of the container, and the bead-shaped first or second depressions extending here, which cross the recess, are interrupted in this area, and they are partially extended beyond this point. Bead-shaped depressions extending laterally beside the flat recess may be connected to this recess in the form of bead-shaped webs.

The hinges at the front and rear edges of the container consist of individual tongues which engage the profiled rails. The tongues are reinforced such that the bead-shaped first or second depressions extend toward the tongues. Both increased rigidity of the edge of the container and good introduction of forces from the tongue-ties into the edge of the container are thus achieved.

The first depressions in the area of the tongue-ties preferably have a cross-sectional contour tapering toward the tongues.

At the front edge of the container, second bead-shaped depressions are led from the front wall of the container into the front edge of the container and there to the individual tongues.

The second depressions in the area of the tongues also preferably have a cross-sectional contour tapering toward the tongues.

The joint for the container door is preferably designed as a plate fold, which is folded upward at right angles from the lateral edges of the container. This part of the container is reinforced by third, bead-shaped depressions, which extend from the rear wall of the container into the rear edge of the container and point toward the plate folds. The third depressions are usually located in the transition area between the side walls of the container and the rear wall of the container or the lateral edges of the container and the rear edge of the container.

The third depressions in the area of the plate folds preferably have a cross-sectional contour tapering toward the plate folds.

Additional reinforcement of the container is achieved by the front wall of the container being provided with a fourth depression sequence as a reinforcing means, extending ovally into the interior space of the container. The front wall of the container may additionally also be provided with bead-shaped depressions extending in parallel or at right angles to the axis of rotation of the joint. In the case of the oval shape of the front wall of the container, the bottom of the container also has an oval contour in this area, while the top side extends in parallel to the front edge of the container. A possible difference in height can be offset with a step. The step also brings about reinforcement of the container in the area of the front wall of the container. The top side of the shape usually contains openings for the installation of a container closing means.

In addition to the first, second, and third bead-shaped depressions, the stability of the edge of the container can also be increased by a bead-shaped bulge, which extends over at least part of the circumference and acts as a reinforcing means. The bead-shaped bulge is interrupted at the points at which intersections with the bead-shaped depressions are located.

A further object of the invention is to provide an airplane oxygen supply unit container formed of aluminum which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure is a perspective view of the oxygen supply unit container for an airplane, according to the invention.

DETAILED DESCRIPTION OF THE PREFERRED EMBODIMENT

Referring to the drawing in particular, the only figure shows a perspective view of a container 1 with a container door 3, which is shown as a detail. The container 1 is made of aluminum plate with a thickness of 0.5 mm as a pot-shaped container, with a front container wall 41, a rear container wall 42, and a container bottom 5. The edge of the container, comprising a front container edge 61, a rear container edge 62, and a lateral container edge 63, is folded over to the outside, and acts as a contact surface for the container door 3. The front container edge 61 and the rear container edge are provided with a hinge 7 each for fastening profiled rails 8. The figure shows only one the profiled rail 8 at the front container edge 61.

The hinge 7 consists of slots 9 in the profiled rails 8, into which tongues 10 of corresponding shape extend, the tongues 10 are made in one piece with the front container edge 61 and the rear container edge 62. The profiled rails 8 can be folded around the hinges 7, and are used to install the container 1 together with the oxygen supply unit located in it, which is not shown in the figure, in an aircraft (also not shown).

To reinforce the container 1, on the one hand, and to strengthen the tongues 10, on the other hand, first bead-shaped depressions 2 are provided, which extend from the container bottom 5 over the rear container wall 42 into the rear container edge 62 and terminate there, tapering conically, in toward the tongues 10. In the area of the container bottom, two adjacent first depressions 2 each are connected by a bead-shaped semicircle 11. To reinforce the tongues 10 at the front container edge 61, the second depressions 21 are provided, which terminate, tapering conically, in toward the tongue 10. The second depressions 21 extend frown the front container wall 41 into the front container edge 61. The container bottom 5 also has, as additional reinforcing means, a flat recess 12, which points toward the interior of the container and is connected to the first depressions 2 by means of bead-shaped webs 13. The depression 12 is used to stabilize the flat surface of the container bottom 5 between the first depressions 2 and can be used, from the rear side, to attach a type plate at the same time.

The container door 3 is connected to the container 1 by means of a. joint 14. The joint 14 is shown in the figure in the disassembled state. The joint 14 consists of a drilled hole 15 in the door edge 16 of the container door 3 and of upright plate folds 17 located on the lateral container edge 63, wherein the connection is made by means of pins 18 passed through. To reinforce the rear container edge 62 in the area of the plate folds 17, the third depressions 22 are provided, which extend from the rear container wall 42 or frown the transition area between the rear container wall 42 and the lateral container walls 43 and into the rear container edge 62, and point toward the plate folds 17 there. The first, second, and third depressions 2, 21, 22 are made with a radius of between 6 and 7 mm.

In addition to the first, second, and third depressions 2, 21, 22, the front container edge 61 and the two lateral container edges 63 are reinforced by a circumferential, bead-shaped bulge 19, which begins in the area of the plate folds 17 or ends there after extending over the circumference once.

An additional reinforcement of the container 1 is achieved by bulging the front container wall 41 as a fourth depression 23 ovally into the interior space of the container. The container bottom 5 also has the oval contour in this area, while the top side 231 extends in parallel to the front container edge 61, and a difference in height is offset by a step 232. The step 232 leads to an additional reinforcement of the front container wall 41. The top side 231 contains openings 233 for a container closing means (locking structure), not shown in the figure.

While a specific embodiment of the invention has been shown and described in detail to illustrate the application of the principles of the invention, it will be understood that the invention may be embodied otherwise without departing from such principles.

What is claimed is:

1. A container for an oxygen supply unit including a container bottom and container side walls with a container edge extending around at least a part of said container, a container door pivotable around a joint at a rear container edge, and with profiled rails foldable around hinges at front and rear container edges, in parallel to an axis of rotation of said joint, said rear container edge including tongues forming part of said hinges; and reinforcing means including:

bead-shaped depressions extending from one of said container bottom and said container side wall over said rear container edge said bead-shaped depressions extending from said container bottom over said rear container wall, over said rear container edge whereat each of said first bead-shaped depressions are connected to a corresponding tongue.

2. Container according to claim 1, wherein:
said container bottom has rectangular, flat recess pointing toward an interior of said container in a middle of said container bottom, said flat recess forming an additional reinforcing means.

3. Container according to claim 1, wherein: said bead-like depressions have a cross-sectional contour tapering toward said tongue in an area of said rear container edge adjacent to said tongues.

4. Container according to claim 1, wherein:
lateral container edges and said front container edge of said container edge are provided, at least partially, with a circumferential, bead-shaped bulge defining a further reinforcing means.

5. A container according to claim 1, wherein said reinforcing means further includes second bead-shaped depressions extending from one of said container bottom and said front container wall over said front container edge and third bead-shaped depressions extending in a transition area between said rear container wall and said container side walls.

6. Container according to claim 5, wherein:
said bead-shaped depressions and said second bead-shaped depressions are brought together as a semicircle in an area of said container bottom.

7. Container according to claim 5, wherein:
said front container edge has tongues as part of said hinges, said second bead-like depressions extending from said front container wall over said front container edge whereby said second bead-like depressions contact corresponding tongues.

8. Container according to claim 5, wherein:
said rear container edge has plate folds forming part of said joint, said plate folds being connected to said third bead-like depressions which extend from said rear container wall over said rear container edge.

9. Container to claim 8, wherein:
said third bead-like depressions have a cross sectional contour tapering toward said plate folds in an area of said rear container edge adjacent to said plate folds.

10. Container according to claim 5, wherein:
said front container wall has a forth depression forming reinforcing means, said forth depression ovally bulging into an interior space of said container.

11. A container for an oxygen supply unit including a container bottom and container side walls with a container edge extending around at least a part of said container, a container door pivotable around a joint at a rear container edge, and with profiled rails foldable around hinges at front and rear container edges, in parallel to an axis of rotation of said joint, said front container edge including tongues as part of said hinges; and reinforcing means including bead-shaped depressions extending from one of said container bottom and said front container wall over said front container edge, said bead-like depressions extending from said front container wall over said front container edge whereat said bead-like depressions contact corresponding tongues.

12. Container according to claim 11 wherein:
said bead-like depressions have cross sectional contour tapering toward said tongues in an area of said front container edge adjacent to said tongues.

13. A container for an oxygen supply unit including a container bottom and container side walls with a container edge extending around at least a part of said container, a container door pivotable around a joint at a rear container edge, and with profiled rails foldable around hinges at front and rear container edges, in parallel to an axis of rotation of said joint, said rear container edge includes tongues forming part of said hinges; and reinforcing means including: first bead-shaped depressions extending from one of said container bottom and said container side wall over said rear container edge, said first bead-like depressions extending from said container bottom over a rear container wall, over said rear container edge whereat each of said first bead-shaped depressions are connected to a corresponding tongue; second bead-shaped depressions extending from one of said container bottom and said front container wall over said front container edge; and third bead-shaped depressions extending in a transition area between said rear container wall and said container side walls, said rear container edge having plate folds forming part of said joint, said plate folds being connected to said third bead-like depressions which extend from said rear container wall over said rear container edge.

* * * * *